Patented July 6, 1937

2,086,337

UNITED STATES PATENT OFFICE 2,086,337

PROCESS FOR THE MANUFACTURE OF MIXED QUINONE DYESTUFFS

Erik Schirm, Dessau, Germany, assignor to General Aniline Works Inc., New York, N. Y., a corporation of Delaware No Drawing. Application July 7, 1933, Serial No. 679,397. In Germany July 8, 1932

21 Claims. (Cl. 260—56.5)

It is known that dyestuffs with either free or acylated amino groups appear as quite different shades when in acid mediums than when in alkaline mediums, which means that according to whether they are dyed in an acid or in an alkaline bath, they are not fast either to alkali or to acid. Now it is true that by arylating of the amino group the sensitiveness to acid or to alkali of the dyestuffs containing amino groups can be reduced, whereby the shade is at the same time shifted towards the blue side of the spectrum; yet the effect in this case is often not sufficient and furthermore the arylating is not always practicable. Another means of enhancing the fastness to acid or to alkali of dyestuffs is by acylating (acetylating, benzoylating) the amino group, whereby the auxochromic action of the latter is however almost completely neutralized.

Now it has been found that, with excellent results and without the aforementioned disadvantages, one can convert dyestuffs containing amino groups into acid- and alkali-fast products by introducing a quinone residue into the amino group according to well known methods.—Hereby, owing to the electro-negative character of the quinone, their basic character will be neutralized to such a degree, that the amino group loses its power of forming salts with acids, and consequently the phenomena halochromistry, connected with the forming of salts, will not appear. On the other hand the quinones being strong chromophores, the intensity of color of the amino dyestuffs is at the same time remarkably increased by the entrance of the quinone residue and in many cases the tone will undergo a valuable alteration. Thus the present process results in rendering practicable and valuable many dyestuffs which were otherwise either of no use or of a very limited value because of their sensitiveness to acid and alkali. The process is of a particular importance for obtaining fast brown and black dyeings.

Of further great importance is the fact, observed by the inventor of the present process, that by adding quinone residues to the dyestuff molecule the affinity towards the fibre containing cellulose ("substantivity") will be either brought about or increased. This effect appears particularly when condensing two dyestuff molecules with one quinone molecule, whereby the dyestuff residues, in para-position to each other, are bound on the quinone nucleus, just as it happens in the case with simple amines such as aniline. Yet the single entrance of a dyestuff residue into quinone will of itself suffice to convert a non-substantive dyestuff into a substantive one, for instance in using secondary disazo-dyestuffs as components. Moreover the present process permits one to prepare dyestuffs which are most suitable for the dyeing of animal fibres.

Besides employing finished dyestuffs one may also condense suitable dyestuff-intermediates with quinones and afterwards form the dyestuffs. It is to be understood that quinones which are capable of adding two amine molecules may be condensed according to the present process with an amine having no dyestuff character on the one hand and with an amino-dyestuff or dyestuff-intermediate on the other hand, or with a dyestuff on the one hand and with an intermediate or a dyestuff differing from the former on the other hand, the sequence of the two condensing operations being suitably determined according to the special reaction conditions such as the solubility relations. There is of course no objection to condensing in a similar manner a dyestuff containing two free amino groups with a quinone molecule capable of two additions or with two quinone molecules capable of one addition.

As to the initial materials to be considered for the present process, one may employ amino dyestuffs of all categories such as azo-, azine-, oxazine-, thiazine-, acridine-, triphenylmethane-, xanthene-, anthraquinone- dyestuffs etc. There is also a large choice as to the quinones suitable for the present process, for example benzoquinone, its homologues and substitution products. Of particular interest in this connection are certain halogen quinones such as trichlor-benzoquinone and chloranil, because in comparison with the non- or less-halogenated quinones they have the advantage that at the condensation with the amino bodies no reduction of any part of the quinone to the corresponding hydro-quinone occurs, only hydro-halogen being split off. It is therefore recommended that one employ in this case an addition of acid binding agents such as alkali metal or alkaline earth carbonates or -acetates or the like.

As an alternative, the excess consumption of quinones such as benzo-quinone etc. which react through self-reduction, can be avoided by admixing a suitable oxidizing agent during the condensation, such as hydrogen peroxide or chromic acid salts, which re-converts the formed hydroquinone immediately back into the quinone. It is even permissible and advantageous to work in first instance with the hydro-quinone and an oxidizing agent, since in many a case the hydroquinone is more easily obtainable or of a higher stability than the corresponding quinone itself.

A commercially most valuable embodiment of the present process results from the practice of condensing the quinones also on the fiber, either by soaking the latter initially with a solution of the dyestuff to be condensed or, if the quinone possesses a sufficient affinity for the fiber, by applying the quinone to the fiber and adding the treated fiber to the slop-padding or dyeing bath, the fiber in this case being initially added to a solution of the quinone or of hydro-quinone plus an oxidizing agent.

One may also perform the condensation and the dyeing in one and the same bath by adding to the dyeing bath at the beginning a sufficient amount of quinone for the condensation.

*Example 1*

Using a p-aminomonoazo-dyestuff, obtained in the well-known manner by coupling benzoldiazonium chloride with 1,6- or 1,7-naphthylamine-sulphonic acid, a 2% dyeing on wool is made by adding 5% of acetic acid, 10% of sodium sulphate and about 4% of benzo-quinone, these substances being put into the nearly exhausted dyeing bath. Then one heats to 75° C. for about 2 hours. The dyed material after being taken out and rinsed is much faster to acid and alkali than before the treatment. The quinone-aftertreatment may also be carried out in a fresh bath.

The 1,6- and 1,7-naphthylaminesulphonic acids can be substituted in this example by the corresponding 1-methylamino-naphthalene sulphonic acids.

*Example 2*

73 parts by weight of the p-aminobenzolazo-2,6-naphthol-sulphonic acid sodium obtained in the well-known manner by coupling diazotized p-amino-acetanilide with 2,6-naphthol-sulphonic acid in alkaline solution and by subsequent saponification, are dissolved in 1500 parts of cold water. Then one adds a solution of 33 parts of benzo-quinone in the centuple amount of water whereupon one heats gradually to 90–95° C. After treatment at this temperature for about one hour, one salts out the product while hot with 600 parts of common salt. The thus separated condensation product is then filtered off while hot and is finally dried.

The dyestuff, the constitution of which may be represented by the following formula

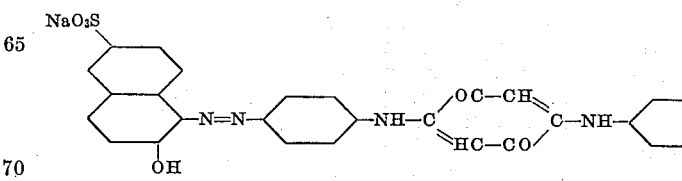

dyes cotton grey violet from a soda alkaline bath and the colour is fast to acid and alkali. The above dyestuff is also very effective on wool or silk.

*Example 3*

Cotton is dyed from a soda alkaline bath in the usual manner with 2% from the dyestuff prepared of tetrazotized benzidine, coupled through the aid of an alkali with 2 mols of 1,8-amino-naphthol-3.6-disulphonic acid ("Diamineblue BB"; Schultz-Julius, Farbstofftabellen 1914, Nr. 337) after treatment in the dye bath for about ½–¾ of an hour one adds 4% of benzo-quinone. The temperature is kept at 90–95° C. for a further half an hour whereupon the cotton is taken out of the bath, rinsed cold and dried. The thus obtained colour compared with the usual one is by far more intensive and is not a blue with a reddish shade but is a blackish blue.

*Example 4*

93 weight parts of the same blue dyestuff as employed in the foregoing example, are heated at 90–95° C. for several hours with 32 parts of benzo-quinone and 4500 parts of water. The resulting product is salted out, filtered and dried. The thus obtained dyestuff dyes cotton to a remarkably purer blue (without reddish shade) than the dyestuff not treated with quinone.

In this example the benzo-quinone can be substituted by anilino-benzo-quinone.

*Example 5*

239 weight parts of 2,5,7-aminonaphtholsulphonic acid are boiled under reflux for 8–10 hours together with 123 parts of chloranil, 400 parts of crystallized sodium acetate and 8000 parts of 50% alcohol. After having distilled off the alcohol one dissolves the reaction product in much water, filters the solution while hot and saturates the filtrate with common salt after an addition of sufficient soda to obtain a distinct alkaline reaction. After the mass cools down it is filtered the residue being dried.

The thus obtained intermediate which may be represented by the following constitution

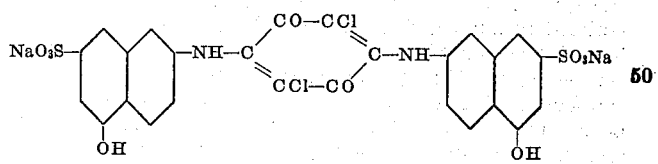

can be coupled with diazo components in the well known manner forming substantive azo-dyestuffs. Thus for instance a substantive salmon red is obtained with benzoldiazonium salts.

In this example the 2,5,7-aminonaphtholsulphonic acid can be substituted by 2,8,6-aminonaphtholsulphonic acid or by 1,8,3,6-aminonaphtholdisulphonic acid.

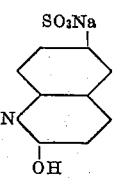

Also the chloranil can be substituted by trichlorbenzo-quinone.

What I claim is:

1. Process for the manufacture of mixed water soluble quinone dyestuffs comprising the condensation of quinones of the general formula

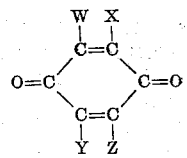

wherein W and Z constitute atoms selected from the group consisting of hydrogen and halogen atoms, and Z also the radical

of an aromatic amine (R constituting an aryl radical, and R' constituting an atom or radical selected from the group consisting of hydrogen, and alkyl and aralykyl radicals) wherein X and Y constitute atoms selected from the group consisting of hydrogen and halogen, with dyestuffs containing amino groups, in a manner known per se, which amino groups take part in the condensation and are present in the final dyestuff.

2. Process for the manufacture of mixed water soluble quinone dyestuffs comprising the condensation of benzo-quinone with dyestuffs containing amino groups, in the manner known per se, which amino groups take part in the condensation and are present in the final dyestuff.

3. Process for the manufacture of mixed water soluble quinone dyestuffs comprising the condensation of chlorinated benzo-quinones with dyestuffs containing amino groups, in the manner known per se, which amino groups take part in the condensation and are present in the final dyestuff.

4. Process for the manufacture of mixed water soluble quinone dyestuffs comprising the condensation of trichlor-benzo-quinone with dyestuffs containing amino groups, in the manner known per se, which amino groups take part in the condensation and are present in the final dyestuff.

5. Process for the manufacture of mixed water soluble quinone dyestuffs comprising the condensation of chloranil with dyestuffs containing amino groups, in the manner known per se, which amino groups take part in the condensation and are present in the final dyestuff.

6. Process for the manufacture of mixed water soluble quinone dyestuffs comprising the condensation of quinones of the general formula

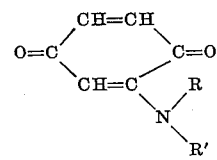

wherein R constitutes an aromatic hydrocarbon radical and R' constitutes an atom or radical selected from the group consisting of hydrogen and an alkyl and aralkyl radical, with dyestuffs containing amino groups, in a manner known per se, which amino groups take part in the condensation and are present in the final dyestuff.

7. Process for the manufacture of mixed water soluble quinone dyestuffs comprising the condensation of anilino-quinone with dyestuffs containing amino groups, in the manner known per se, which amino groups take part in the condensation and are present in the final dyestuff.

8. Process for the manufacture of mixed water soluble quinone dyestuffs comprising the condensation of quinones of the general formula as per claim 1, with dyestuffs containing free amino groups, in the manner known per se, which amino groups take part in the condensation and are present in the final dyestuff.

9. Process for the manufacture of mixed water soluble quinone dyestuffs comprising the condensation of quinones of the general formula as per claim 1, with dyestuffs containing mono-alkylated amino groups, in the manner known per se, which amino groups take part in the condensation and are present in the final dyestuff.

10. Process for the manufacture of mixed water soluble quinone dyestuffs comprising the condensation of quinones of the general formula as per claim 1, with dyestuffs containing mono-aralkylated amino groups, in the manner known per se, which amino groups take part in the condensation and are present in the final dyestuff.

11. Process for the manufacture of mixed water soluble quinone dyestuffs comprising the condensation of quinones of the general formula as per claim 1, with azodyestuffs containing amino groups, in the manner known per se, which amino groups take part in the condensation and are present in the final dyestuff.

12. Process for the manufacture of mixed water soluble quinone dyestuffs comprising the condensation of quinones of the general formula

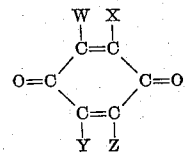

wherein W and Z constitute atoms selected from the group consisting of hydrogen and halogen atoms, and Z also the radical

of an aromatic amine (R constituting an aryl radical, and R' constituting an atom or radical selected from the group consisting of hydrogen, and alkyl and aralkyl radicals), wherein X and Y constitute atoms selected from the group consisting of hydrogen and halogen, in the manner known per se with completely formed azodyestuffs containing amino groups.

13. Process for the manufacture of mixed water soluble quinone dyestuffs comprising the condensation of quinones of the general formula as per claim 12 in the manner known per se with aminonaphthol-sulphonic acids and in allowing diazonium compounds to react upon the condensation products.

14. Process for the manufacture of mixed water soluble quinone dyestuffs comprising the condensation of quinones of the general formula as per claim 12 in the manner known per se with 2,5,7-aminonaphthol-sulphonic acid and in allowing diazonium compounds to react upon the condensation products.

15. Process for the manufacture of mixed water soluble quinone dyestuffs comprising the condensation of quinones of the general formula as per claim 12 in the manner known per se with 2,8,6-aminonaphthol-sulphonic acid and in allowing diazonium compounds to react upon the condensation products.

16. Process for the manufacture of mixed water soluble quinone dyestuffs comprising the condensation of quinones of the general formula as per claim 12 in the manner known per se with 1,8-aminonaphthol-3,6-disulphonic acid and in allowing diazonium compounds to react upon the condensation products.

17. Process for the manufacture of mixed water soluble quinone dyestuffs comprising the condensation of quinones of the general formula as per claim 12 in the dyeing bath and in the manner known per se, with dyestuffs containing amino groups.

18. Process for the manufacture of mixed water soluble quinone dyestuffs comprising the condensation of quinones of the general formula as per claim 12 on the fibre and in the manner known per se, with dyestuffs containing amino groups.

19. In the production of mixed water soluble quinone dyestuffs, the step comprising introducing a quinone of the general formula specified in claim 12 into molecules of a dyestuff containing an amino group.

20. The process of manufacturing mixed water soluble quinone dyestuffs comprising condensing a quinone of the general formula specified in claim 12 with a completely formed amino dyestuff selected from the group consisting of anthraquinone, xanthene, triphenylmethane, acridine, azine, oxazine and thiazine compounds.

21. The process of manufacturing mixed water soluble quinone dyestuffs comprising reacting a quinone of the general formula specified in claim 1 with a dyestuff intermediate having a free amino group which amine will be present in the final dyestuff, which intermediate is capable of being converted into a water soluble amino dyestuff and then completing the formation of such amino dyestuff.

ERIK SCHIRM.